United States Patent [19]

Rudy et al.

[11] Patent Number: 5,660,890
[45] Date of Patent: Aug. 26, 1997

[54] WATER-BASED SOFT COATING FOR METALS

[75] Inventors: Rosanna Pall Rudy, East Hanover; Andrew Anthony Romano, Sparta, both of N.J.

[73] Assignee: Ashland Inc., Columbus, Ohio

[21] Appl. No.: 723,854

[22] Filed: Sep. 30, 1996

[51] Int. Cl.⁶ .................................................. B05D 3/02
[52] U.S. Cl. ........................... 427/388.4; 106/14.14; 106/14.15; 106/14.21; 106/14.29; 524/166; 422/14; 422/16
[58] Field of Search .................. 106/14.14, 14.15, 106/14.21, 14.29; 422/14, 16; 427/388.4; 524/166

[56] References Cited

U.S. PATENT DOCUMENTS

| | | | |
|---|---|---|---|
| 3,925,087 | 12/1975 | Lechner | 106/14 |
| 4,495,225 | 1/1985 | Ciuba | 106/14.28 |
| 4,631,083 | 12/1986 | Christhiff | 106/14.23 |
| 4,675,215 | 6/1987 | Ciuba | 427/372.2 |
| 4,718,942 | 1/1988 | Laura | 106/14.29 |
| 4,729,791 | 3/1988 | Laura | 106/14.23 |
| 4,749,412 | 6/1988 | Ciuba | 106/14.28 |
| 5,338,346 | 8/1994 | Luttinger | 106/14.29 |
| 5,407,471 | 4/1995 | Rohr et al. | 106/14.29 X |
| 5,603,818 | 2/1997 | Brunt et al. | 427/409 X |

*Primary Examiner*—Michael Lusignan
*Attorney, Agent, or Firm*—David L. Hedden

[57] ABSTRACT

This invention relates to a water-based coating comprising as separate components (A) a grind component comprising in admixture (1) a water compatible overbased alkaline earth alkyl-aryl sulfonate; (2) an organic amine; and (3) an inorganic borate corrosion inhibitor; and (B) a liquid component comprising (1) water; (2) an acrylic emulsion; (3) an organic amine. The coatings are particularly useful for coating ferrous metal surfaces.

17 Claims, No Drawings

WATER-BASED SOFT COATING FOR METALS

FIELD OF THE INVENTION

This invention relates to a water-based coating comprising as separate components (A) a grind component comprising in admixture (1) a water compatible overbased alkaline earth alkyl-aryl sulfonate; (2) an organic amine; and (3) a borate corrosion inhibitor; and (B) a liquid component comprising (1) water; (2) an acrylic emulsion; (3) an organic amine. The coatings are particularly useful for coating ferrous metal surfaces.

BACKGROUND OF THE INVENTION

Corrosion of metals is a significant problem where metal surfaces are exposed to water, air, inorganic metal salts, and the like. One of the most severe sources of corrosion is a seawater environment, that is, seawater itself, seawater mist or spray, or the salty air which can exist near bodies of seawater. A seawater environment can attack and corrode ferrous and non-ferrous metals.

A variety of equipment is subject to corrosion by seawater, including piping, dry-docks, steel cables, superstructures of an equipment on offshore drilling and production rigs, desalination plants, seawater mineral extracting plants, surfaces of ships and barges, and tanks subjected to seawater environment.

Many soft skin coatings are known, such as those disclosed in U.S. Pat. Nos. 3,925,087, 4,495,225, 4,675,215, and 4,729,791, which provide corrosion protection from aqueous environments for metal surfaces. The soft coatings described in these patents are not water-based. They contain specified combinations of (a) an overbased alkaline earth organic aliphatic or mixed one ring aliphatic-aromatic sulfonate salt, (b) a drying oil, (c) a metal drier, (d) a paraffinic oil, and possibly (e) a solvent. These coatings disclosed provide corrosion resistance for metals which are exposed to aqueous environments, particularly saltwater environments. The thickness of the coatings is usually no greater than 10 mils, but is typically, 1 to 3 mils.

A well known and commercially successful ballast coating within the scope of U.S. Pat. No. 3,925,087 is MAG-NAKOTE® ballast tank coating. This commercial coating is highly effective in inhibiting the corrosion of ballast tanks and other large surface area equipment made of ferrous metals which is exposed to a seawater environment.

In general, a thicker coating will last longer and provide better corrosion resistance than a thinner coating of an equally effective substance, but is more expensive and takes longer to apply. Additionally, when a thicker layer is applied, the coating requires an inconveniently long period of time to cure. In addition, a thicker layer tends to flow, and a coating thickness of greater than about 3 or 4 mils generally cannot be maintained. Further, while these coatings are considered the best available from an economic level for inhibiting the corrosion of ferrous metal surfaces, they are typically useful for only a period of up to two years before a new coat is required. Consequently, longer-lasting corrosion protection is highly desirable.

Accordingly, a need exists for a water-based, corrosion inhibiting, environmentally friendly, semi-hard coating which can achieve a coating thickness of to about 3 mils minimum, which will cure rapidly, resist sagging, and exhibit exceptionally effective and long-lasting corrosion inhibition. Since these coatings are harder than soft skin coatings, they will support a heavier load and are thus safer to walk upon.

SUMMARY OF THE INVENTION

This invention relates to a water-based semi-hard coating composition comprising as separate components:

A. a grind component comprising in admixture:
  (1) a water compatible overbased alkaline earth alkyl-aryl sulfonate corrosion inhibitor, wherein said salt is present in an amount of about 10 to 50 percent by weight, based upon the weight of the grind component;
  (2) an organic amine neutralizing agent in an amount of 1–10 percent by weight, based upon the total weight of the grind component; and
  (3) a borate corrosion inhibitor pigment in an amount of about 5 to 25 percent by weight, based upon the weight of the grind component; and B. a liquid component comprising:
  (1) water diluent in an amount of about 5 to 25 percent by weight, based upon the weight of the liquid component;
  (2) an acrylic emulsion film former in an amount of about 10 to 50 percent by weight, based upon the weight of the liquid component;
  (3) an organic amine neutralizing agent in an amount of 1–5 percent by weight, based upon the total weight of the liquid component.

The coatings are used primarily to coat metal surfaces exposed to seawater and have a thickness of up to 1–10 mils. The coatings are particularly useful for coating ferrous metal surfaces which have a large surface area, such as ballast tanks, which are exposed to seawater. Because the coatings are water-based, they avoid the use of hydrocarbons which can create stress to the environment. The coatings are non slippery and provide a tough surface.

The coating cures quickly, but is semi-hard and durable. It exhibits little sagging or running during application, adheres well to metal surfaces, and is abrasion resistance. The coating can penetrate a porous surface, i.e. rust, or spread under existing corrosion-inhibiting coatings, and has little or no tendency to crack, flake or peel. The coating withstands contact with warm water or turbulence. It is useful for marine and offshore drilling applications, including coating ballast tanks, desalination plants, seawater mineral extract plants, the bottom section of a jack-up rig, seawater cooling circuits, portuary installations, metal equipment, pipes, and the like.

BEST MODE AND OTHER MODES OF THE INVENTION

The grind component of the coating contains about 5 to 80 percent by weight, preferably 20 to 40 percent by weight, and more preferably 25 to 35 percent by weight, of a water emulsifiable rust-inhibitive concentrate, where said weight is based on the weight of the coating. The inorganic/organic complex comprises an overbased alkaline earth organic sulfonate salt corrosion inhibitor. The preferred complexes are overbased salts of organic sulphonic acids which can be characterized by the following structural formula:

wherein
  R represents an alkyl-aryl group, e.g. $C_{18-40}H_{32-73}PH$ (wherein PH represents phenylene);
  M represents a metal of valence m;
  m represents the valence of M and is preferably an integer ranging from 1 to 4, more typically 1 or 2;

X represents a basic anion having a valence of x;

x represents the valence of X and typically an integer ranging from 1 to 3; and a represents the excess over stoichiometry, in equivalents, for the basic salt $M_xX_m$.

Accordingly, a is greater than 0 and preferably greater than 1. Values for a of 3 or 4 are not unusual and values of about 8 or more are permissible.

The inorganic/organic complexes are available in water emulsifiable concentrates wherein the stable inorganic/organic complex. Accordingly, the amount of water is typically about 50 parts per 100 by weight, based on the weight of the complex. A diluted concentrate containing, for example, 70% water can be used without substantial modification in this invention.

The preferred water emulsifiable rust-preventing concentrate has the following physical and chemical properties:

| % Nonvolatile (wt.) | 96% minimum |
| Viscosity (cps, @ 25° C.) | 60,000–100,000 |
| Flash point (COC °C.) | 320° C. |
| Density (g/cc) | 0.93 to 0.99 |

This product, commercially designated as SACI® 400 EPW overbased water emulsifiable organic sulfonate salt. It is available from Witco Chemical Corporation, New York. The amount of inorganic/organic complex dispersed in the water is around 40% by weight, and the complex is the calcium sulfonate/calcium carbonate type having the formula $(RSO_3)_2Ca$, wherein R and a have the significance indicated previously.

The grind component of the coating also contains an amino alcohol. Generally, the amount of amino alcohol needed in the coating is from 1 to 10 weight percent of amino alcohol, preferably 3 to 8 weight percent based upon the total weight of the coating. The weight percent will vary depending upon the basicity of the amino alcohol. Examples of amino alcohols are amino-2-methyl-1-propanol, 2-amino-2-ethyl-1,3-propanediol, 2-amino-1-butanol, 2-amino-2-methyl-1,3-propanediol, tris(hydroxymethyl) aminomethane and 2-dimethyl-amino-2-methyl-propanol. Preferably used as the amino alcohol is diethylethanolamine.

The other component of the grind component is an inorganic borate, such as calcium, strontium, molybdate, and zinc borate, preferably zinc borate. Generally, the amount of borate used in the coating is from 1 to 10 weight percent, preferably 1 to 5 weight percent based upon the total weight of the coating.

The liquid component contains water in an amount of about 5 to 25 percent by weight, based upon the weight of the liquid component.

Additionally, the liquid component contains an acrylic emulsion and/or a styrene acrylic emulsion. Typically these emulsions have an acid number of about 10 to about 50, preferably about 20 to about 30; a glass transition temperature of from about 40° C. to about 60° C., preferably about 50° C. to about 55° C.; and particle size of less than about 1.0 micron, preferably less than about 0.1 micron on the average. The amount of acrylic emulsion and/or a styrene acrylic emulsion used in coating is from about 10 to 50 percent by weight, based upon the weight of the liquid component. The acrylic emulsion is a dipersion of an acrylic polymer dispersed in water. These emulsions are prepared by emulsion polymerization by methods well known in the art. Preferably, the acrylic emulsions are prepared by the polymerization of ethylenically unsaturated monomers selected from the group consisting of (meth) acrylic acid, acrylic acid, and esters thereof.

Generally, the amount of amino alcohol needed in the coating is from 1 to 10 weight percent of amino alcohol, preferably 3 to 8 weight percent based upon the total weight of the coating. The weight percent will vary depending upon the basicity of the amino alcohol. Examples of amino alcohols are amino-2-methyl-1-propanol, 2-amino-2-ethyl-1,3-propanediol, 2-amino-1-butanol, 2-amino-2-methyl-1,3-propanediol, tris(hydroxymethyl) aminomethane and 2-dimethyl-amino-2-methyl-propanol. Preferably used as the amino alcohol is diethylethanolamine.

Coatings which contain a linseed oil also contain a metal drier in an amount effective to dry the drying oil. Generally, this is an amount of about 0.001 to 0.5 percent by weight of a metal in the metal drier, preferably about 0.002 to 0.02, said percent by weight is based upon the weight of the coating. The metal of the metal drier is selected from the group consisting of carboxylates and/or naphthenates of transition metals and rare earth metals. Preferably the metal of the metal driers is selected from the group consisting of cobalt, zinc, lead, manganese, lanthanum, cerium, iron, and copper, most preferably cobalt and manganese. More preferably, a mixture of carboxylate metal driers is used wherein the metals of the metal drier are cobalt and manganese and the ratio of cobalt to manganese is from 1:10 to 10:1, most preferably 10:1 to 1:10, and the weight percent of metal drier in the coating is from 0.002 to 0.02%.

The coating may also contain additional components such as viscosity modifiers, pigments, stearates, dispersed waxes adhesion promoters, and defoamers.

To prepare the coating, the components of the grind component, i.e. the water emulsifiable rust-inhibitive concentrate, the primary amino alcohol, and the zinc borate are preferably mixed and ground in sequence. Then the liquid component is added to and mixed with the grind component.

After all of the components have been added, it is recommended that composition be mixed for an additional period of time to insure thorough mixing. Preferably, the composition is mixed for an additional 30 minutes.

During the addition of components and mixing, care should be taken to avoid the entrapment of air into the mixture. The viscosity of the mixture is such that entrapped air bubbles are likely to rise to the surface and escape. The composition can be stored in appropriate sealed containers, under ambient conditions.

Corrosion is inhibited on ferrous metal surfaces by applying the coating to the surface to be protected at a thickness of about 1–10 mils, and allowing the coating to cure. Frequently, the coating thickness will be about 3–7 mils. The coating can be formed by any suitable application method such as brushing, rolling, immersion of the surface to be coated, spraying, or the like. Generally, where necessary, the coating will flow sufficiently to provide a smooth and uniform coating even when applied by brush, roller, or the like.

For immersion coating, the surface to be coated is simply dipped into the coating and then removed. The thickness of the coating applied in this way will, of course, vary depending upon the viscosity of the coating.

For reasons of cost effectiveness, spraying is the preferred method of application. Generally, spray coating can be accomplished using less of the coating. Suitable spraying techniques are well known in the art.

Several external factors affect the curing of the coating of this invention. These factors include the presence of air (greater air circulation generally contributes to faster curing); the presence of moisture in the air (less moisture generally contributes to faster curing); the temperature (higher temperatures generally contribute to faster curing); and the coating thickness (a thinner coating generally tends to cure faster). Sometimes these factors affect one another. We have found that a 3 mil coating will typically cure, under most conditions, within about 24 hours. Thicker coatings will require more curing time up to, for example, 48 hours, or under more rigorous conditions, up to 72 hours.

It is preferred that any loose rust or other substances which would limit adhesion be physically or chemically removed from a surface prior to coating. Power or manual wire brushing is preferred. It is not necessary to remove the tightly bonded rust which will very often be found on a metal surface. However, use of a degreaser such as solvent emulsifying compound is recommended where there is any oily contamination followed by water jetting.

The following Examples provide specific embodiments of the invention. Other embodiments of the invention are contemplated which are within scope of the invention. All "parts" in the examples are parts by weight based upon the total weight of the coating composition unless otherwise specified.

EXAMPLES

Examples 1–6 illustrate the preparation and use of a coating which contains an acrylic resin. Ammonia is included in the coating as a neutralizing amine. Example 7 illustrates the use of a styrene acrylic resin in the coating. The two formulations are shown in Table I. Viscosity was measured by a Brookfield Viscometer.

The coatings were tested to determine their resistance to saltwater by subjecting coated panels to the salt fog or salt spray test as substantially set forth in ASTM B117.73. The salt fog or salt spray test is considered to be considerably more severe than other tests such as the static immersion test or the agitated immersion test.

To conduct the salt fog test, a metal panel (mild steel ASTM A366) measuring 3"×6"×0.032" was coated with a 3 mil thickness of the coating by using a film applicator. The coating on the panel was allowed to cure under ambient conditions (25° C., 30% humidity). The coatings cured satisfactorily to a tough, semi-hard film within 24–48 hours.

The panel was placed in a salt-fog chamber, in a rack, leaning slightly back from a vertical position. The panel was supported at two points at its bottom edge. The salt-fog chamber was operated at about 35° C., at 100% humidity, with a 5% NaCl mist or fog. The coated panel was observed at irregular time intervals for signs of corrosion, by visual inspection of the panel left undisturbed in the rack. Table I shows the data recorded in days when about 10% of the panel surface exhibited light corrosion and, in come cases, at other corrosion levels.

| COMPONENT (% BY WEIGHT) | EXAMPLE NUMBER | | | | | | |
|---|---|---|---|---|---|---|---|
| | 1 | 2 | 3 | 4 | 5 | 6 | 7 |
| WATER | 47.0 | 52.0 | 48.0 | 47.88 | 47.76 | 47.26 | 32.0 |
| AMMONIA | 10.0 | 2.0 | 1.5 | 1.5 | 1.5 | 1.5 | 0 |
| LINSEED OIL | 13.0 | 13.0 | 13.0 | 13.0 | 13.0 | 13.0 | 0 |
| ACR[2] | 0 | 0 | 5.0 | 5.0 | 5.0 | 5.0 | 0 |
| ACSTYR[3] | 0 | 0 | 0 | 0 | 0 | 0 | 20.0 |
| SACI 400 | 30.0 | 30.0 | 30.0 | 30.0 | 30.0 | 30.0 | 30.0 |
| DEA[4] | 0 | 3.0 | 2.5 | 2.5 | 2.5 | 2.0 | 3.0 |
| ZINC BORATE | 0 | 0 | 0 | 0 | 0 | 0 | 15.0 |
| Co/Mn DRIER | 0 | 0 | 0 | 0.12 | 0.24 | 1.0 | 0 |
| WAX DISPERSION | 0 | 0 | 0 | 0 | 0 | 1.0 | 0 |
| TEST RESULTS ON COATINGS | | | | | | | |
| VISCOSITY (cps) | 1800 | 500 | 910 | 500 | 440 | 500–800 | 1000 |
| SALT FOG TEST[5] | 21 | 7 | 8 | 15 | 20 | 18–21 | 47 |

The coatings have low volatility and resistant to rust formation.
[2]RHOPLEX WL-51 acrylic resin sold by Rohm & Haas.
[3]PLIOLITE 7104 styrene acrylic resin sold by Goodyear.
[4]Diethylethanolamine.
[5]Number of days it took to get 10% corrosion (1.5 mils DFT) after being subjected to salt fog test.

We claim:
1. A water-based composition for semi-hard coatings comprising as separate components:
  A. a grind component comprising in admixture:
    (1) a water compatible overbased alkaline earth alkylaryl sulfonate, wherein said salt is present in an amount of about 10 to 50 percent by weight, based upon the weight of the grind component;
    (2) an organic amine in an amount of 1–10 percent by weight, based upon the total weight of the grind component; and
    (3) an inorganic borate corrosion inhibitor in an amount of about 5 to 25 percent by weight, based upon the weight of the grind component; and
  B. a liquid component comprising in admixture:
    (1) water in an amount of about 5 to 25 percent by weight, based upon the weight of the liquid component;
    (2) an emulsion selected from the group consisting of an acrylic emulsion, a styrene acrylic emulsion, and mixtures thereof in an amount of about 10 to 50 percent by weight, based upon the weight of the liquid component;
    (3) an organic amine in an amount of 1–5 percent by weight, based upon the total weight of the grind component.

2. The water based coating claim 1 wherein the emulsion has an acid number of about 10 to about 50, a glass transition temperature of from about 40° C. to about 60° C., and a particle size of less than about 1.0 micron.

3. The water based coating claim 2 wherein the overbased salt is SACI 400 EPW.

4. The water based coating of claim 3 wherein the organic amine is diethylethanolamine.

5. The water based coating of claim 4 wherein the corrosion inhibitor is zinc borate.

6. The water based coating of claim 5 wherein the acrylic emulsion is a styrene acrylic emulsion.

7. The water based coating claim 6 wherein the emulsion has an acid number of about 20 to about 30, a glass transition temperature of from about 50° C. to about 55° C., and a particle size of less than about 0.1 micron on the average.

8. The water based coating of claim 7 wherein a metal drier is added to the liquid component in an amount of 0.05 to 2.0 percent by weight, based upon the total weight of the liquid component.

9. The water based coating of claim 8 which contains a drying oil and ammonia.

10. A process for inhibiting corrosion on a surface which comprises:

A. forming a coating up to about 10 mils thick on the surface wherein said coating comprises:
  (1) a grind component comprising in admixture:
    (a) a water compatible overbased alkaline earth alkyl-aryl sulfonates, wherein said salt is present in an amount of about 10 to 50 percent by weight, based upon the weight of the grind component;
    (b) an organic amine in an amount of 1–10 percent by weight, based upon the total weight of the grind component; and
    (c) an inorganic borate corrosion inhibitor in an amount of about 5 to 25 percent by weight, based upon the weight of the grind component; and
  (2) a liquid component comprising in admixture:
    (a) water in an amount of about 5 to 25 percent by weight, based upon the weight of the liquid component;
    (b) an emulsion selected from the group consisting of an acrylic emulsion, a styrene acrylic emulsion, and mixtures thereof in an amount of about 10 to 50 percent by weight, based upon the weight of the liquid component;
    (c) an organic amine in an amount of 1–5 percent by weight, based upon the total weight of the grind component; and
  (2) allowing the coating to cure.

11. The process of 10 wherein the emulsion has an acid number of about 10 to about 50, a glass transition temperature of from about 40° C. to about 60° C., and a particle size of less than about 1.0 micron.

12. The process of claim 11 wherein overbased salt is SACI 400 EPW.

13. The process of claim 12 wherein the organic amine is diethylethanolamine.

14. The process of claim 13 wherein the corrosion inhibitor is zinc borate.

15. The process of claim 14 wherein the acrylic emulsion is a styrene acrylic emulsion.

16. The process of claim 15 wherein the emulsion has an acid number of about 20 to about 30, a glass transition temperature of from about 50° C. to about 55° C., and a particle size of less than about 0.1 micron on the average.

17. The process of claim 16 wherein a metal drier is added to the liquid component in an amount of 0.05 to 2.0 percent by weight, based upon the total weight of the liquid component.

* * * * *